United States Patent [19]

Wiktor et al.

[11] 4,388,535

[45] Jun. 14, 1983

[54] ELECTRIC POWER INTERRUPTING SWITCH

[75] Inventors: Dominik M. Wiktor, Cranford; Siegfried Schlindwein, Succasunna, both of N.J.

[73] Assignee: Automatic Switch Company, N.J.

[21] Appl. No.: 265,500

[22] Filed: May 18, 1981

[51] Int. Cl.$^3$ ........................ H01H 19/64; H02B 1/20

[52] U.S. Cl. ........................................ 307/113; 361/378

[58] Field of Search ............... 307/113, 139, 142, 140; 361/378

[56] References Cited

U.S. PATENT DOCUMENTS 2,641,636 6/1953 Born et al. .......................... 361/378

3,172,013 3/1965 Fehr ................................ 307/113 X

FOREIGN PATENT DOCUMENTS 867000 5/1961 United Kingdom ................ 307/113

*Primary Examiner*—Donald A. Griffin

*Attorney, Agent, or Firm*—Alan H. Levine

[57] ABSTRACT

A switch for interrupting electric power to the customer of a utility, the switch including two female contacts for accepting the male plug-in contacts of a watt-hour meter, and two male contacts for insertion into the female contacts which ordinarily receive the male contacts of the meter. A switch is located between one of each female contact and its corresponding male contact, and an operator, such as a solenoid, opens the switch(es) in response to a signal, so as to disconnect the customer's load from the utility source. A latch holds the switch(es) open until another signal causes a second operator, such as a solenoid, to deactivate the latch and permit the switch(es) to reclose. An auxiliary switch in the circuits for energizing the two solenoids deenergizes the first solenoid when the switch(es) are latched open, and deenergizes the second solenoid when the switch(es) become unlatched and move toward their closed condition. Each switch includes two movable contacts which are opened in sequence, so that one contact serves as an arcing contact to preserve the other contact.

16 Claims, 9 Drawing Figures

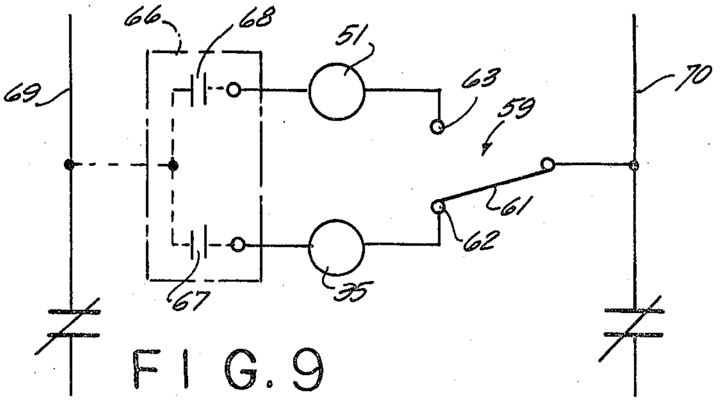
FIG. 9
FIG. 2
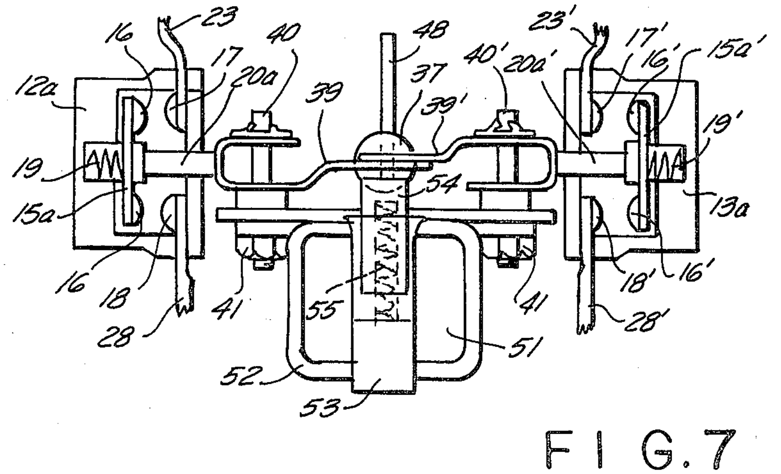
FIG. 7
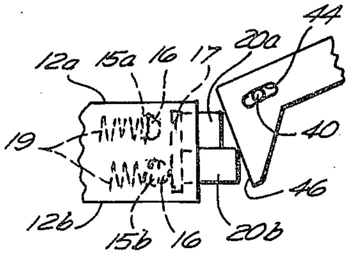
FIG. 8
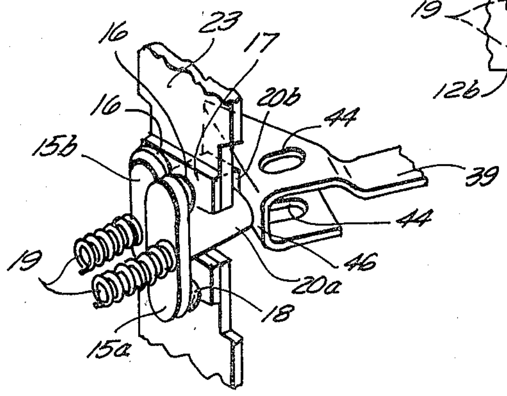

ELECTRIC POWER INTERRUPTING SWITCH

This invention relates to electric power interruption switches, and more particularly to a switch capable of being operated by remote control for disconnecting utility power from a customer of the utility in the event that the energy consumption by the customer rises above a predetermined value.

For the purpose of energy management by an electric utility, it has been suggested that customers volunteer to participate in a peak load reduction scheme, in return for a reduction in electric rate charges. Typically, a customer will agree that between certain hours of the day, i.e., those hours during which there is peak demand on the power company's facilities, the customer's load will not rise above some predetermined value. If during these peak hours the customer should begin to draw more than the agreed upon amount of power, he receives a signal, and if within a given time after the signal the load is not reduced, all electric power to the customer is cut off. The customer can be reconnected, at his option, and if the load has been reduced, e.g., some appliances have been turned off, the power remains on, assuming that the load reduction has been sufficient to lower the amount of power being drawn below the predetermined value.

It is an object of the present invention to provide on interruption switch capable of fitting into a standard watt-hour meter housing, between the meter and the terminals which the meter otherwise engages, so that it may be used as part of an energy management system by an electric utility.

It is another object of the invention to provide such a switch which is capable of being operated from a remote location.

It is a further object of the invention to provide such a switch which is electrically operated but held mechanically in both its open and close positions, so that it need be energized only momentarily and does not continuously draw power.

It is an additional object of the invention to provide a switch operator cooperable with a pair of movable switch contacts and arranged to move the contacts in sequence so that one opens before the other, the latter thereby serving as an arcing contact to protect the former.

Additional objects and features of the invention will be apparent from the following description in which reference is made to the accompanying drawings.

In the drawings

FIG. 2 is a view of a portion of FIG. 1 showing the switch open;

FIG. 7 is a view similar to a portion of either of FIGS. 3 and 5 at an intermediate point during opening of the switch;

FIG. 8 is a perspective view of the parts shown in FIG. 7; and

FIG. 9 is a schematic diagram showing a circuit which forms part of the interruption switch.

Referring to FIGS. 1–6, the electric power interruption switch chosen to illustrate the present invention includes a bracket 10, preferably made of sheet metal, having a horizontal central portion **10*a*. Along one edge the bracket is bent through 90° to form a downwardly extending lip 10*b*, and at its opposite edge the bracket is bent through 90° in the opposite direction to present an upwardly projecting tab 10*c*. An interior section of the bracket is cut along three sides and bent upwardly to form an upstanding wall 10*d***.

Figure 1:
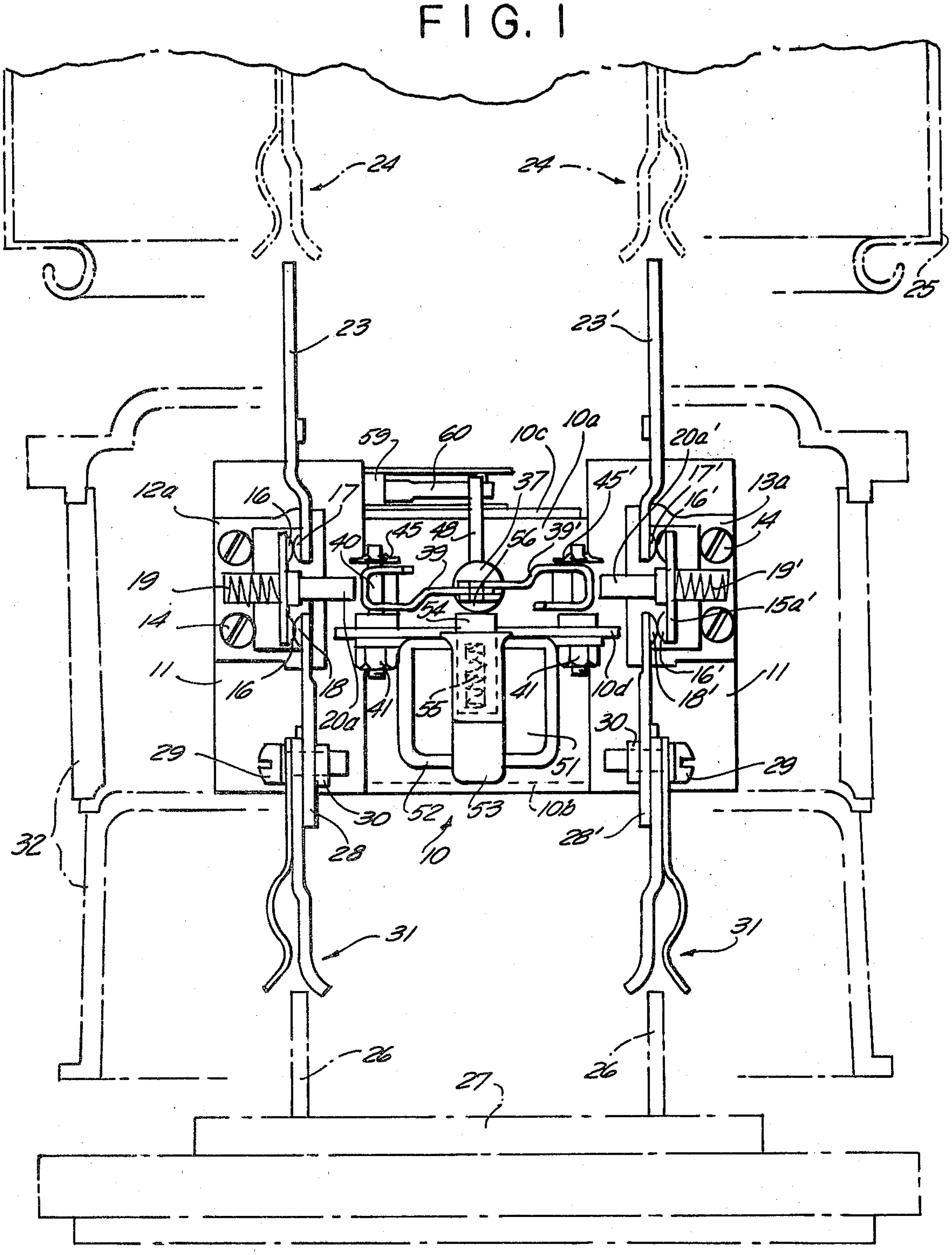
FIG. 1 is a top plan view of an electric power interruption switch according to this invention, the switch being closed.
Figure 5:
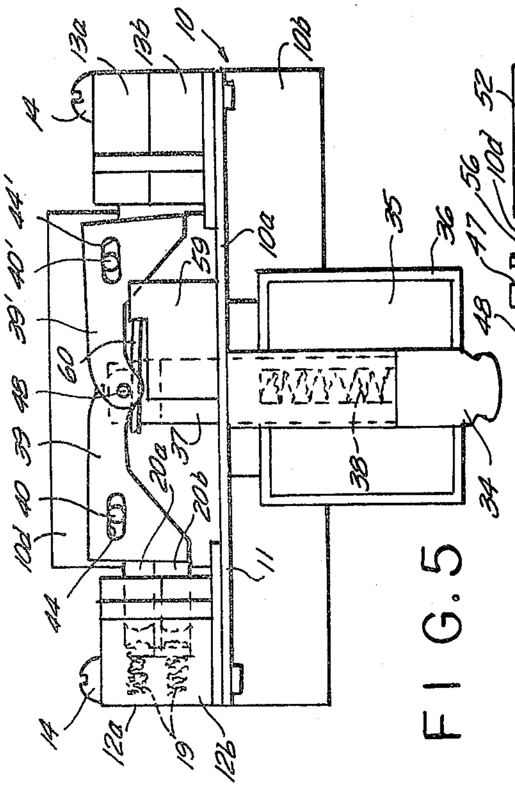
FIG. 5 is an end view of the switch in open condition.
Figure 4:
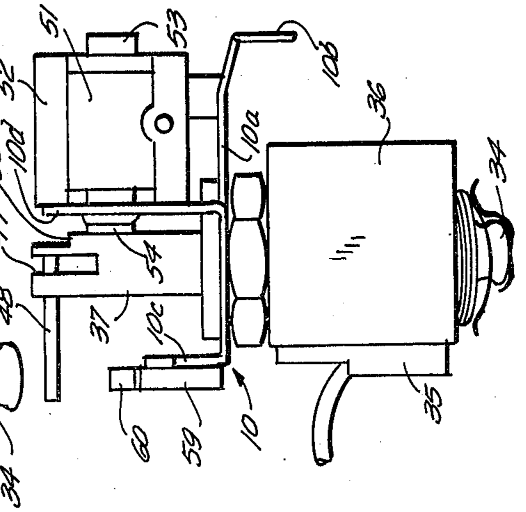
FIG. 4 is a side view of the switch operator and latch arrangement when the switch is closed.
Figure 3:
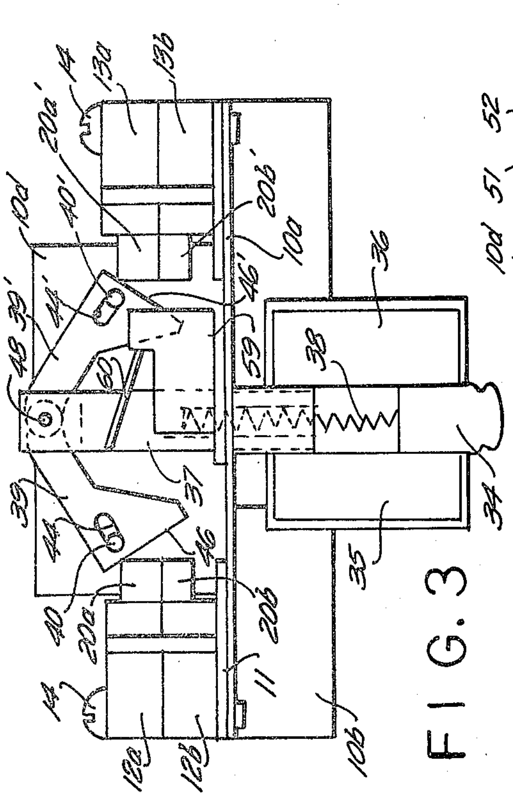
FIG. 3 is an end view of the switch in closed condition.
Figure 6:
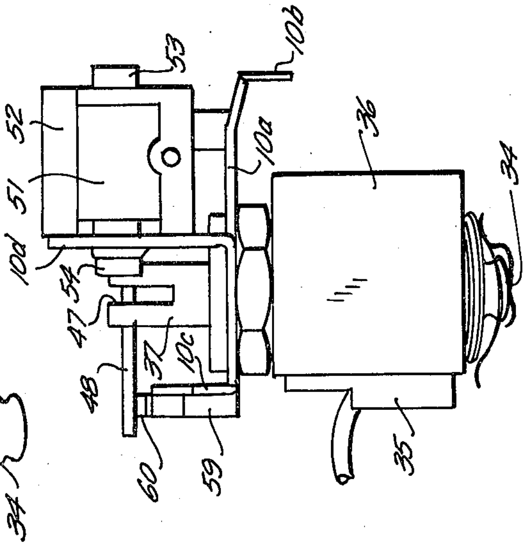
FIG. 6 is a side view of the switch operator and latch arrangement when the switch is open.

Supported on the upper surface of bracket central portion **10*a* are two spaced apart insulator plates 11 (FIGS. 1, 3 and 5). Resting upon one of the plates 11 are two superposed switches 12*a* and 12*b*, and resting upon the other plate 11 are two superposed switches 13*a* and 13*b*, the switches being secured to bracket 10 by screws 14. Switch 12*a* includes a housing containing a movable contact bar 15*a* (FIGS. 1 and 8) carrying two movable contacts 16, and switch 12*b* similarly includes a housing containing a movable contact bar 15*b* carrying two movable contacts 16. A single stationary contact 17 extends across the width of both contact bars opposite a movable contact 16 carried by each bar, and another stationary contact 18 extends across the width of both contact bars opposite the other movable contact 16 carried by each bar. A compression spring 19 constantly urges each movable contact bar 15*a* and 15*b* toward the stationary contacts 17 and 18**.

Two push buttons **20*a* and 20*b* (FIGS. 1, 2, 3, 5, 7 and 8) project slidably through the switch housings and engage the faces of movable contact bars 15*a* and 15*b*, respectively, opposite the faces engaged by springs 19. If push buttons 20*a* and 20*b* are depressed into their respective switch housings, contact bars 15*a* and 15*b* move away from stationary contacts 17 and 18 and the switches open. Upon release of the push buttons, springs 19 return the contact bars to establish engagement between movable contacts 16 and stationary contacts 17 and 18** to reclose the switches.

Switches **13*a* and 13*b* are of exactly the same construction as switches 12*a* and 12*b*. Therefore, the parts of these switches corresponding to the parts of switches 12*a* and 12*b*** bear the same reference numerals followed by a prime.

Stationary contact 17 is carried by one end of a metal bar 23 (FIGS. 1, 2, and 8) projecting through the housings of switches **12*a* and 12*b* and beyond the edge of insulator plate 11. Similarly, stationary contact 17$^1$ is carried by one end of a metal bar 23$^1$. Bars 23 and 23$^1$ serve as male contacts adapted to electrically engage the usual female contacts 24 (FIG. 1), within the meter box 25 mounted on the building being supplied with electricity, which are usually engaged by the male contacts 26 of the electric meter 27**.

Stationary contacts 18 and 18$^1$ are each carried by by one end of a matal bar 28 and 28$^1$, respectively, which project through the housings of their respective switches. Mounted on each bar 28 and 28$^1$, by a screw 29 and 30, are a pair contact pieces, at least one of which is springy in nature, defining two female contacts 31. These female contacts are adapted to electrically engage the usual male contacts 26 of an electric meter 27. Thus, it will be seen that the interruption switch of this invention can be interposed between a conventional electric meter 27 and the female contacts in the meter box which the meter contacts ordinarily engage. In this way, all power flowing to the utility customer must pass through switches 12*a* and 12*b*, on one side, and through switches 13*a* and 13*b* on the other side. No alteration to the meter or meter housing is required for installation of the interruption switch, except that meter box extensions 32 are used to house the interruption switch.

Switches 12*a, b* and 13*a, b* are operated by an electric solenoid 35 (FIGS. 3–6) mounted on the underside of bracket central portion 10*a*, the solenoid being surrounded by a metal yoke 36. Movable vertically inside a tube 34 fixed within solenoid 35 is an armature 37, which extends through a hole in bracket portion 10*a* to the region above that bracket portion; hence the upper end of armature 37 is visible in FIGS. 1 and 2. Armature 37 is constantly urged to its uppermost position (FIGS. 3 and 4) by a compression spring 38 inside tube 34. When solenoid 35 is energized, the armature moves downwardly, against the force of spring 38, to its lowermost position shown in FIGS. 5 and 6.

Movement of armature 37 is transmitted to switches 12*a, b* and 13*a, b* by two bell cranks 39 and $39^1$, respectively, (FIGS. 1–3 and 5). Each bell crank is formed initially of flat sheet metal bent into a J-shaped cross section; the long arm of the J defines the longer arm of the bell crank, and the hook-shaped portion of the J defines the shorter arm of the bell crank. Two stationary pivot pins 40 and $40^1$ project horizontally from upstanding bracket wall 10*d*, the pins being held in place by nuts 41 engaging the threaded ends of the pins. Pin 40 extends through two aligned slots 44 (see also FIG. 8) in the hook-shaped portion of bell crank 39, the slots being longer than the diameter of the pin. A fastener 45, gripping pin 40 near its free end prevents bell crank 39 from sliding off pivot pin 40. In this way, bell crank 39 is pivotally mounted on pin $40^1$. The arrangement is such that a face 46 of the short arm of bell crank 39 faces the outer ends of push buttons 20*a* and 20*b*, and a face $46^1$ of the short arm of bell crank 39 faces the outer ends of push buttons $20a^1$ and $20b^1$.

The upper end of armature 37 has a longitudinal slot 47 (best see in FIGS. 4 and 6) accommodating the free ends of the long arms of bell cranks 39 and $39^1$. A pin 48 extends through aligned holes in the armature and the two bell crank arms to pivotally interconnect the armature and bell cranks. Pin 48 extends well beyond the contour of armature 37 for a purpose to be described below.

Comparing FIGS. 3 and 5, it will be seen that when solenoid 35 is deenergized (FIG. 3), push buttons 20*a, b* and $20a^1$, $b^1$ extend out of their respective switch housings to the maximum extent and hence switches 12*a, b* and $12a^1$, $b^1$ are closed (see also FIG. 1). When solenoid 35 is energized, bell cranks 39 and $39^1$ pivot clockwise and counterclockwise, respectively, about pins 40 and $40^1$ to the positions shown in FIG. 5. In this condition, faces 46 and $46^1$ of the bell crank short arms depress push buttons 20*a, b* and $20a^1$, $b^1$ into their respective switch housings resulting in the opening of switches 12*a, b* and $12a^1$, $b^1$ (see also FIG. 2).

An important feature of the invention may be seen most clearly in FIGS. 7 and 8. Bell crank 39 follows a generally arcuate path as it moves from its FIG. 3 position to its FIG. 5 position, and push button 20*a* is closer to the center of curvature of that path, i.e., closer to pin 40, than is push button 20*b*. As a result, during the arcuate movement of bell crank 39, face 46 of the bell crank shorter arm depresses push button 20*a* before it depresses push button 20*b*. Consequently, movable contact bar 15*a* is moved out of engagement with stationary contacts 17 and 18 before movable contact bar 15*b* is so moved, as shown in FIGS. 7 and 8. Thus, when bar 15*a* separates from stationary contacts 17 and 18, no arc is drawn between the stationary contacts and the movable contacts 16 of bar 15*a*. When, thereafter, bar 15*b* separates from stationary contacts 17 and 18, an arc is drawn between the stationary contacts and the movable contacts 16 of bar 15*b*. In this way, movable contacts 16 of bar 15*b* serve as arcing contacts which prevent damage, due to arcing, to contacts 16 of bar 15*a*.

Another important feature of the invention may be seen with reference to FIGS. 3 and 5. Movement of armature 37 downwardly, when solenoid 35 is energized, is resisted by the four springs 19 which tend to maintain switches 12*a, b* and $12a^1$, $b^1$ closed. However, because armature 37 and bell cranks 39 and $39^1$ form a toggle arrangement, the mechanical advantage offered thereby permits a less powerful solenoid than would otherwise be required to be used for operating the switches. The fact that pins 40 and $40^1$ fit through elongated slots 44 and $44^1$ permit both pivotal and translatory movement of the bell cranks 39 and $39^1$.

According to the invention, armature 37 can be mechanically latched in the position of FIGS. 2 and 5 wherein it holds switches 12 and 13 open. This is accomplished using a second solenoid 51 (FIGS. 1, 2, 4, and 6) mounted on upstanding bracket wall 10*d*. A metal yoke 52 surrounds the solenoid, and a tube 53 is fixed within it. Movable horizontally within tube 53 is an armature 54 the longitudinal axis of which intersects the longitudinal axis of armature 37. A compression spring 55 within tube 53 constantly urges the free end of armature 54 into engagement with the side of armature 37 (see FIGS. 1 and 4). The free end of armature 37 is notched to define an upwardly facing shoulder 56. When solenoid 35 is energized, drawing armature 37 downwardly to open switches 12 and 13, spring 55 causes armature 54 to snap over shoulder 56 and thereby prevent return of armature 37 upwardly. It is only when solenoid 51 is energized, causing armature 54 to retract into tube 53 against the force of spring 55, that armature 37 moves upwardly under the influence of spring 38 to allow switches 12 and 13 to close.

From the description above, it will be appreciated that when the switches 12 and 13 are closed, solenoid 35 need be energized only momentarily to open the switches and keep them open. The reason is that as soon as armature 37 reaches its lowermost position, it is mechanically latched in that condition by armature 54, and hence solenoid 35 need not be continuously energized to keep the switches open. Furthermore, to close the switches 12 and 13, solenoid 51 need be energized only momentarily, since as soon as armature 54 disengages shoulder 56, spring 38 returns armature 37 upwardly.

Mounted on upwardly projecting bracket tab 10*c* is a single pole, double throw microswitch 59 (FIGS. 1 and 3–6) having an operator arm 60 arranged in the path of vertical movement of pin 48. When armature 37 is in its uppermost position (FIGS. 3 and 4) switch 59 is in the condition shown in FIG. 9 wherein its movable contact 61 engages its stationary contact 62. When armature 37 moves into its lowermost, latched condition, pin 48 moves arm 60 to shift movable contact 61 out of engagement with contact 62 and into engagement with contact 63.

FIG. 9 also illustrates a control relay 66 including two switches 67 and 68. Switch 67 is connected in series between the power lines 69 and 70 with solenoid 35 and contact 62 or switch 59. Switch 67 may be wire or radio controlled to close on a signal from the electric utility. Switch 68 is adapted to be closed by the customer, such as by using a push button (not shown) within the customer's premises.

Should the customer begin to draw more power than agreed upon with the utility, the utility by remote control closes switch 67. As a result, a circuit is completed which energizes solenoid 35. In response, armature 37 is pulled downwardly opening switches 12 and 13 to cut off power to the customer's premises. At the same time, microswitch 59 is operated by pin 48 to shift movable contact 61 from stationary contact 62 to stationary contact 63. The circuit energizing solenoid 35 is thereby opened, but armature 37 is latched in its lowermost position by armature 54. After the customer has reduced his load, he causes switch 68 to close, as a result of which a circuit is completed for energizing solenoid 51. Consequently, armature 54 is pulled into solenoid 51, thereby releasing armature 37 which returns to its uppermost position. Switches 12 and 13 reclose so that power is again supplied to the customer. Also, microswitch 59 returns to the condition shown in FIG. 9 wherein the circuit energizing solenoid 51 is opened. Use of microswitch 59 insures that each solenoid is energized only momentarily during each operation of the interruption switch.

The invention has been shown and described in preferred form only, and by way of example, and many variations may be made in the invention which will still be comprised within its spirit. It is understood, therefore, that the invention is not limited to any specific form or embodiment except insofar as such limitations are included in the appended claims.

We claim:

1. A switch for interrupting electric power to the customer of a utility, there being an electric watt-hour meter between the utility source and the customer's load, the switch comprising:

(a) two female contact members for accommodating the male plug-in contacts of a watt-hour meter, (b) two male contact members capable of being accommodated by the female contacts into which the watt-hour meter is usually plugged, (c) switch means between at least one of the female contact members and a corresponding one of the male contact members, (d) electrically-controlled operator means for opening the switch means in response to an electrical signal, and (e) means operable in response to opening of the switch means for latching the switch means in its open condition to hold the switch means open even after termination of the electrical signal, whereby when the switch means is opened by the operator means, at least one female contact member is electrically disconnected from its corresponding male contact member to thereby interrupt the flow of utility power to the customer load, the interruption continuing as long as the latching means holds the switch means open.

2. A switch for interrupting electric power as defined in claim 1 including a switch means between each female contact member and its corresponding male contact member.

3. A switch for interrupting power as defined in claim 1 wherein each male contact member includes a projecting metal bar, and the switch means includes at least one stationary contact cooperable with a movable contact, the stationary contact being carried by the same metal bar which constitutes the male contact member.

4. A switch for interrupting service as defined in claim 1 including operator means for deactivating the latching means in response to a signal.

5. A switch arrangement comprising:

(a) stationary contact means, (b) two movable contacts movable into and out of engagement with the stationary contact means to close and open the switch, respectively, (c) an operator having a movable part, (d) means for transmitting movement from the movable part to the movable contacts to open the switch, the transmitting means during its movement operatively engaging one of the movable contacts before the other so as to separate said one movable contact from the stationary contact means before said other movable contact is separated from the stationary contact means, whereby said other movable contact serves as an arcing contact to preserve said one movable contact.

6. A switch for interrupting service as defined in claim 5 wherein the transmitting means includes a pivotally mounted lever having a switch-operating portion which moves along a substantially arcuate path, said one of the movable contacts being closer to the center of curvature of the arcuate path than the other movable contact.

7. A switch for interrupting electrical power to the customer of a utility, there being an electric watt-hour meter between the utility source and the customer's load, the switch comprising:

(a) two female contact members for cooperation with the male plug-in contacts of a watt-hour meter, (b) two male contact members for cooperation with the female contacts into which the watt-hour meter is usually plugged, (c) switch means between at least one of the female contact members and a corresponding one of the male contact members, (d) operator means for opening the switch means in response to a signal, the operator means being electrically energized to open the switch means, (e) means operable in response to opening of the switch means for latching the switch means in its open condition to hold the switch means open even after termination of the signal, and (f) an auxiliary switch in the circuit for energizing the switch operator means, the auxiliary switch being closed when the switch means is closed, and the auxiliary switch opening in response to latching of the switch means in open condition, so that the switch operator means is deenergized upon latching of the switch means in open condition, whereby when the switch means is opened by the operator means, at least one female contact member is electrically disconnected from its corresponding male contact member to thereby interrupt the flow of utility power to the customer load, the interruption continuing as long as the latching means holds the switch means open.

8. A switch for interrupting service as defined in claim 7 including operator means for deactivating the latching means in response to an electrical signal, the auxiliary switch being in the circuit for energizing the latch operator means, the auxiliary switch being closed when the switch means is latched in open condition, and the auxiliary switch opening in response to movement of the switch means out of its latched open condition, whereby the latch operator means is deenergized upon unlatching of the switch means and movement of the latter towards its closed condition.

9. A switch for interrupting service as defined in claim 8 wherein the auxiliary switch is a single pole, double throw switch.

10. A switch for interrupting electric power to the customer of a utility, there being an electric watt-hour meter between the utility source and the customer's load, the switch comprising:

(a) two female contact members for cooperation with the male plug-in contacts of a watt-hour meter,
(b) two male contact members for cooperation with the female contacts into which the watt-hour meter is usually plugged,
(c) switch means between at least one of the female contact members and a corresponding one of the male contact members,
(d) operator means for opening the switch means in response to a signal, the operator means including an electric solenoid having an armature,
(e) means for transmitting movement of the armature to the switch means, in response to energization of the solenoid, to cause opening of the switch means, and
(f) means operable in response to opening of the switch means for latching the switch means in its open condition to hold the switch means open even after termination of the signal, the latching means cooperating with the armature to latch the switch means in open condition, whereby when the switch means is opened by the operator means, at least one female contact member is electrically disconnected from its corresponding male contact member to thereby interrupt the flow of utility power to the customer load, the interruption continuing as long as the latching means holds the switch means open.

11. A switch for interrupting service as defined in claim 10 wherein the latching means includes another electrical solenoid having an armature, the armature of the latching solenoid engaging the armature of the switch operator solenoid to latch the switch means in open condition, and the latching solenoid being responsive to an electrical signal for moving its armature to release the armature of the switch operator solenoid and thereby permit closing of the switch means.

12. A switch for interrupting service as defined in claim 10 wherein the transmitting means includes a pivotally mounted bell crank, one arm of the bell crank being operatively connected to the armature, and the other arm of the bell crank engaging the switch means to operate the latter.

13. A switch for interrupting electric power to the customer of a utility, there being an electric watt-hour meter between the utility source and the customer's load, the switch comprising:

(a) two female contact members for cooperation with the male plug-in contacts of a watt-hour meter,
(b) two male contact members for cooperation with the female contacts into which the watt-hour meter is usually plugged,
(c) switch means between at least one of the female contact members and a corresponding one of the male contact members, the switch means including stationary contact means and two movable contacts which engage the stationary contact means when the switch means is closed and which are separated from the stationary contact means when the switch is opened,
(d) operator means for opening the switch means in response to a signal, and
(e) means for transmitting movement from the operator means to the switch means for opening the latter, the transmitting means during its movement operatively engaging one of the movable contacts before the other so as to separate said one movable contact from the stationary contact means before said other movable contact is separated from the stationary contact means, so that said other movable contact serves as an arcing contact to preserve said one movable contact, and
(f) means operable in response to opening of the switch means for latching the switch means in its open condition to hold the switch means open even after termination of the signal, whereby when the switch means is opened by the operator means, at least one female contact member is electrically disconnected from its corresponding male contact member to thereby interrupt the flow of utility power to the customer load, the interruption continuing as long as the latching means holds the switch means open.

14. A switch for interrupting service as defined in claim 13 wherein the transmitting means includes a pivotally mounted lever having a switch-operating portion which moves along a substantially arcuate path, said one of the movable contacts being closer to the center of curvature of the arcuate path than the other movable contact.

15. A switch for interrupting electric power to the customer of a utility, there being an electric watt-hour meter between the utility source and the customer's load, the switch comprising:

(a) two female contact members for cooperation with the make plug-in contacts of a watt-hour meter,
(b) two male contact members for cooperation with the female contacts into which the watt-hour meter is usually plugged,
(c) a switch means between each female contact member and its corresponding male contact member, each switch means including a stationary contact and a movable contact spring biased toward the stationary contact,
(d) operator means for opening the switch means in response to a signal, the operator means including a movable part located between the two switch means,
(e) a pivotally mounted lever for transmitting the motion of the movable part to the movable contact of each of the switch means, each lever having an arm pivotally connected to the movable part, the lever arms being at an angle to each other, in response to movement of the operator movable part, to move the movable contacts against their spring bias away from their respective stationary contacts, and (f) means operable in response to opening of the switch means for latching the switch means in its open condition to hold the switch means open even after termination of the signal, whereby when the switch means is opened by the operator means, at least one female contact member is electrically disconnected from its corresponding male contact member to thereby interrupt the flow of utility power to the customer load, the interruption continuing as long as the latching means holds the switch means open.

16. A switch for interrupting service as defined in claim 15 wherein the pivotal mounting of each lever comprises a fixed pivot pin located within a slot in the lever, the slot being aligned with said arm of the lever.

* * * * *